(12) United States Patent
Dai et al.

(10) Patent No.: US 12,202,970 B2
(45) Date of Patent: Jan. 21, 2025

(54) THERMOPLASTIC COMPOSITION, ELECTRICAL WIRE AND ARTICLE COMPRISING THE ELECTRICAL WIRE

(71) Applicant: SHPP GLOBAL TECHNOLOGIES B.V., Bergen op Zoom (NL)

(72) Inventors: Mian Dai, Shanghai (CN); Kazuhiko Mitsui, Tokyo (JP); Hariharan Ramalingam, Bangalore (IN); Tsutomu Kinoshita, Tokyo (JP); Katsura Hayashi, Tokyo (JP)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 438 days.

(21) Appl. No.: 17/290,832

(22) PCT Filed: Nov. 8, 2019

(86) PCT No.: PCT/IB2019/059625
§ 371 (c)(1),
(2) Date: May 3, 2021

(87) PCT Pub. No.: WO2020/095268
PCT Pub. Date: May 14, 2020

(65) Prior Publication Data
US 2021/0388202 A1 Dec. 16, 2021

Related U.S. Application Data

(60) Provisional application No. 62/757,442, filed on Nov. 8, 2018.

(51) Int. Cl.
*C08L 71/00* (2006.01)
*H01B 1/02* (2006.01)
*H01B 3/30* (2006.01)
*H01B 3/42* (2006.01)
*H01B 7/02* (2006.01)

(52) U.S. Cl.
CPC .............. *C08L 71/00* (2013.01); *H01B 3/306* (2013.01); *H01B 3/427* (2013.01); *H01B 7/0275* (2013.01); *C08L 2203/202* (2013.01); *C08L 2205/03* (2013.01); *H01B 1/02* (2013.01)

(58) Field of Classification Search
CPC ........ C08L 71/00; C08L 71/126; C08L 79/08; C08L 63/00; C08L 63/04; C08L 83/10; C08L 2203/202; H01B 3/247; H01B 3/306; H01B 3/427; H01B 7/0275; C08G 65/4012; C08G 2650/40; C08G 77/46
See application file for complete search history.

(56) References Cited

U.S. PATENT DOCUMENTS

| 2007/0066765 | A1 | 3/2007 | Aneja et al. |
| 2010/0147548 | A1 | 6/2010 | Bhandari et al. |
| 2012/0285721 | A1 * | 11/2012 | Gallucci ............... C09D 183/10 524/424 |
| 2013/0037305 | A1 * | 2/2013 | Fournier ................ H01B 3/427 174/120 C |
| 2014/0183420 | A1 | 7/2014 | Kamoi et al. |
| 2014/0295168 | A1 * | 10/2014 | Ikenaga ..................... C08J 9/28 521/189 |
| 2016/0307664 | A1 | 10/2016 | Obika et al. |
| 2017/0178766 | A1 * | 6/2017 | Saito ..................... H01B 7/0275 |
| 2018/0005724 | A1 | 1/2018 | Bonnet et al. |
| 2018/0048205 | A1 | 2/2018 | Takeda et al. |
| 2018/0072847 | A1 | 3/2018 | Shen et al. |

FOREIGN PATENT DOCUMENTS

| EP | 0323142 A2 * | 7/1989 | |
| EP | 0605197 A2 | 7/1994 | |
| EP | 1369450 A1 | 12/2003 | |
| EP | 3193339 A1 | 7/2017 | |
| JP | 2005330379 A | 12/2005 | |
| WO | 8604079 A1 | 7/1986 | |
| WO | 2012154966 A1 | 11/2012 | |
| WO | 2014078344 A1 | 5/2014 | |
| WO | WO-2016160814 A1 * | 10/2016 | .............. C08L 67/00 |

OTHER PUBLICATIONS

International Search Report for the corresponding International Application No. PCT/IB2019/059625, International Filing date: Nov. 8, 2019; Date of Mailing: Feb. 4, 2020; 5 pages.
Written Opinion for the corresponding International Application No. PCT/IB2019/059625, International Filing date: Nov. 8, 2019; Date of Mailing: Feb. 4, 2020; 7 pages.
European Office Action dated Sep. 26, 2024 for corresponding EP Application No. 19824386.7, 6 pages.

* cited by examiner

*Primary Examiner* — Jennifer A Gillett
(74) *Attorney, Agent, or Firm* — CANTOR COLBURN LLP

(57) ABSTRACT

A thermoplastic composition includes an aromatic poly (ketone), a poly(etherimide), and a reactive additive, wherein each component is present in a particular amount as defined herein. The thermoplastic composition can be useful in an insulating layer disposed over a conductor wire to form an electrical wire. Articles including the thermoplastic composition can be particularly useful in applications including an electrical device component, a railway vehicle component, an auto-mobile component, a marine vehicle component, a construction component, construction component, a building component, or an aircraft component.

17 Claims, No Drawings

THERMOPLASTIC COMPOSITION, ELECTRICAL WIRE AND ARTICLE COMPRISING THE ELECTRICAL WIRE

CROSS-REFERENCE TO RELATED APPLICATIONS

This application is a National Stage application of PCT/IB2019/059625, filed Nov. 8, 2019, which claims benefit of U.S. Provisional Application No. 62/757,442 filed on Nov. 8, 2018, both of which are incorporated by reference herein in their entirety.

BACKGROUND

Aromatic poly(ketone)s such as poly(arylene ether ketone)s are valued due to their resistance to high temperatures, crystallizability, melt extrudability, and injection moldability, thereby making them versatile and useful in many applications. Properties such as strength, stiffness, chemical resistance, and heat resistance can be tailored by blending other poly(ketone)s with various other polymers in order to meet the requirements of a wide variety of consumer products. However, many current aromatic poly(ketone) compositions are less suitable for applications requiring resistance to high heat, such as in certain consumer electronics applications. Accordingly, there remains a continuing need in the art for improved aromatic poly(ketone) compositions having good mechanical properties, excellent heat and chemical resistance, improved adhesion, and excellent electrical performance for many industrial applications, especially in consumer electronics.

SUMMARY

A thermoplastic composition comprises 50 to 99.9 weight percent, or 60 to 95 weight percent, or 70 to 90 weight percent, or 70 to 80 weight percent of an aromatic poly(ketone); 0.1 to 50 weight percent, or 5 to 40 weight percent, or 10 to 30 weight percent, or 15 to 25 weight percent of a poly(etherimide); 0.1 to 20 weight percent, or 0.5 to 10 weight percent, or 1 to 7 weight percent, or 2 to 6 weight percent of a reactive additive; wherein weight percent of each component is based on the total weight of the composition.

An electrical wire comprises a conductor wire; and an insulating layer disposed over the conductor wire, wherein the insulating layer comprises an extrusion layer formed from the thermoplastic composition, optionally, wherein the insulating layers further comprises one or more intervening layers positioned between the conductor wire and the extrusion layer.

An article comprises the electrical wire.

The above described and other features are exemplified by the following detailed description.

DETAILED DESCRIPTION

The present disclosure is related to thermoplastic compositions containing a combination of an aromatic poly(ketone), a poly(etherimide), and a reactive additive. Unexpectedly, blends of the aromatic poly(ketone), poly(etherimide), and reactive additive can provide compositions with balanced mechanical properties, heat and chemical resistance, and electrical properties.

Accordingly, an aspect of the present disclosure is a thermoplastic composition comprising 50 to 99.9 weight percent of an aromatic poly(ketone), 0.1 to 50 weight percent of a poly(etherimide), and 0.1 to 20 weight percent of a reactive additive, wherein the amount of each component is based on the total weight of the composition.

The aromatic poly(ketone) comprises repeating units of formula (1)

(1)

wherein Ar is independently at each occurrence a substituted or unsubstituted, monocyclic or polycyclic aromatic group having 6-30 carbons. Exemplary Ar groups include, but are not limited to, substituted or unsubstituted phenyl, tolyl, naphthyl, and biphenyl. Unsubstituted phenyl is preferred. In some embodiments, the aromatic poly(ketone) can be a poly(arylene ether ketone) (PAEK) comprising repeating units of formula (1) and formula (2)

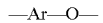

(2)

wherein Ar is defined as above. In some embodiments the aromatic polyketone comprises a poly(ether ketone). A poly(ether ketone) comprises repeating units of formula (3)

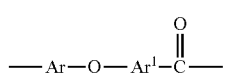

(3)

wherein Ar is defined as above and $Ar^1$ is independently at each occurrence a substituted or unsubstituted, monocyclic or polycyclic aromatic group having 6-30 carbons. Ar can be the same as or different from $Ar^1$. In some preferred embodiments Ar and $Ar^1$ are phenyl groups, preferably unsubstituted phenyl groups.

In some embodiments, the aromatic poly(ketone) comprises a poly(ether ether ketone). A poly(ether ether ketone) comprises repeating units of formula (4)

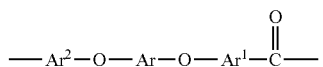

(4)

wherein Ar and $Ar^1$ are defined as above. $Ar^2$ is independently at each occurrence a substituted or unsubstituted, monocyclic or polycyclic aromatic group having 6-30 carbons. Ar, $Ar^1$, and $Ar^2$ can be the same as or different from each other. Additionally, two of Ar, $Ar^1$, and $Ar^2$ can be the same as each other and the third can be different. In some embodiments Ar, $Ar^1$, and $Ar^2$ are phenyl groups, preferably unsubstituted phenyl groups.

Poly(arylene ether ketone)s are generally known, with many examples being commercially available. Examples of commercially available aromatic poly(ketone)s include those sold under the trade name PEEK™, available from VICTREX.

In an aspect, the aromatic poly(ketone) comprises a poly(ether ketone), poly(ether ether ketone), poly(ether ketone ketone), or a combination comprising at least one of the foregoing, preferably a poly(ether ether ketone) of formula (4).

The thermoplastic composition includes the aromatic poly (ketone) in an amount of 50 to 99.9 weight percent. Within this range, the aromatic poly(ketone) can be present in an amount of at least 60 weight percent, or at least 70 weight percent. Also within this range, the aromatic poly(ketone) can be present in an amount of up to 95 weight percent, or up to 90 weight percent, or up to 80 weight percent.

In addition to the aromatic poly(ketone), the thermoplastic composition further comprises a poly (etherimide). Poly (etherimide)s comprise more than 1, for example 2 to 1000, or 5 to 500, or 10 to 100 structural units of formula (5)

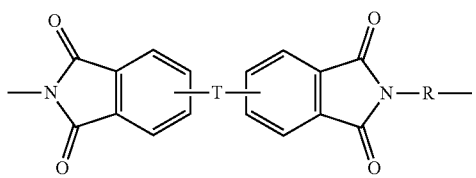

(5)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, in particular a halogenated derivative of any of the foregoing. In some embodiments R is divalent group of one or more of the following formulas (6)

(6)

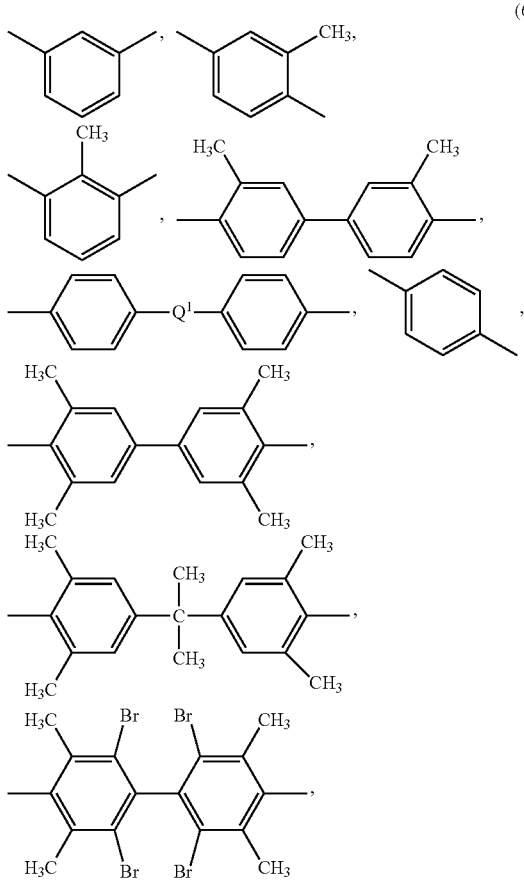

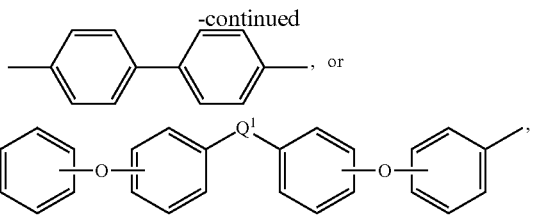

wherein $Q^1$ is —O—, —S—, —C(O)—, —SO$_2$—, —SO—, —P($R^a$)(=O)— wherein $R^a$ is a $C_{1-8}$ alkyl or $C_{6-12}$ aryl, —$C_yH_{2y}$— wherein y is an integer from 1 to 5 or a halogenated derivative thereof (which includes perfluoroalkylene groups), or —($C_6H_{10})_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments no R groups contain sulfone groups.

Further in formula (5), T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups of formula (7)

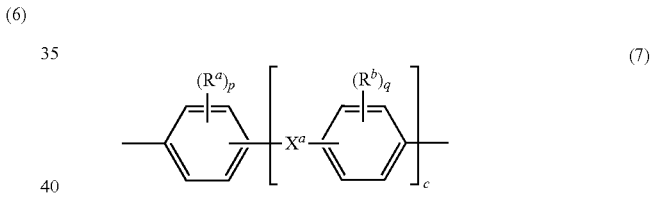

(7)

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (7a)

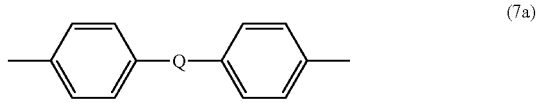

(7a)

wherein Q is —O—, —S—, —C(O)—, —SO$_2$—, —SO—, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (7a) is 2,2-isopropylidene.

In an embodiment in formula (5), R is m-phenylene, p-phenylene, or a combination comprising at least one of the foregoing, and T is —O—Z—O— wherein Z is a divalent group of formula (7a). Alternatively, R is m-phenylene, p-phenylene, or a combination comprising at least one of the foregoing, and T is —O—Z—O wherein Z is a divalent group of formula (7a) and Q is 2,2-isopropylidene. Such materials are available under the trade name ULTEM from SABIC. Alternatively, the polyetherimide can be a copolymer comprising additional structural polyetherimide units of formula (5) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene or a combination comprising at least one of the foregoing; and Z is 2,2-(4-phenylene)isopropylidene, i.e., a bisphenol A moiety, an example of which is commercially available under the trade name EXTEM from SABIC.

In some embodiments, the poly(etherimide) is a copolymer that optionally comprises additional structural imide units that are not polyetherimide units, for example imide units of formula (8)

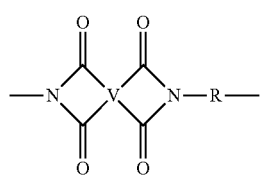
(8)

wherein R is as described in formula (5) and each V is the same or different, and is a substituted or unsubstituted C$_{6-20}$ aromatic hydrocarbon group, for example a tetravalent linker of the formulas

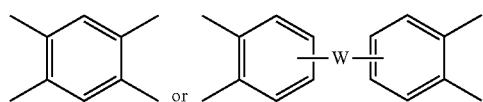

wherein W is a single bond, —O—, —S—, —C(O)—, —SO$_2$—, —SO—, a C$_{1-18}$ hydrocarbylene group, —P(R$^a$)(=O)— wherein R$^a$ is a C$_{1-8}$ alkyl or C$_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the poly(etherimide).

The poly(etherimide) can be prepared by any of the methods known to those skilled in the art, including the reaction of an aromatic bis(ether anhydride) of formula (9) or a chemical equivalent thereof, with an organic diamine of formula (10)

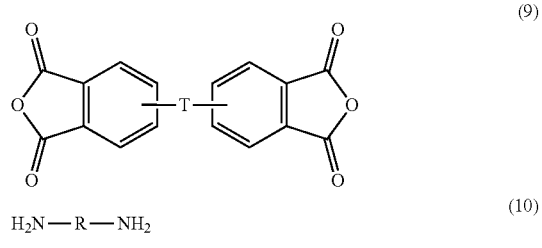

wherein T and R are defined as described above. Copolymers of the polyetherimides can be manufactured using a combination of an aromatic bis(ether anhydride) of formula (9) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2, 2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4- bis(p-amino-t-butyl) toluene, bis(p-amino-t-butylphenyl) ether, bis(p-methyl-o-aminophenyl) benzene, bis(p-methyl-o-aminopentyl) benzene, 1, 3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination thereof.

The poly(etherimide) can include poly(siloxane-etherimide) copolymers comprising polyetherimide units of formula (5) and siloxane blocks of formula (11)

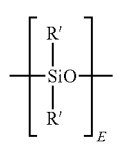
(11)

wherein E has an average value of 2 to 100, 2 to 31, 5 to 75, 5 to 60, 5 to 15, or 15 to 40, each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprises R' groups that have minimal hydrocarbon content. In a specific embodiment, an R' group with a minimal hydrocarbon content is a methyl group.

The poly (siloxane-etherimide)s can be formed by polymerization of an aromatic bis(ether anhydride) of formula (9) and a diamine component comprising an organic diamine (10) as described above or a combination of diamines, and a polysiloxane diamine of formula (12)

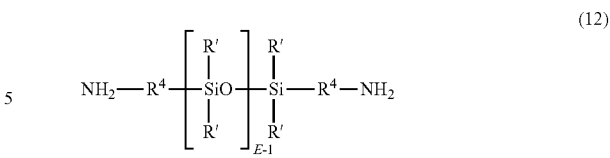
(12)

wherein R' and E are as described in formula (11), and $R^4$ is each independently a $C_2$-$C_{20}$ hydrocarbon, in particular a $C_2$-$C_{20}$ arylene, alkylene, or arylenealkylene group. In an embodiment $R^4$ is a $C_2$-$C_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (12) are well known in the art.

In some poly(siloxane-etherimide)s the diamine component can contain 10 to 90 mole percent (mol %), or 20 to 50 mol %, or 25 to 40 mol % of polysiloxane diamine (12) and 10 to 90 mol %, or 50 to 80 mol %, or 60 to 75 mol % of diamine (10), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (10) and (12) with aromatic bis(ether anhydrides (9), to make polyimide blocks that are subsequently reacted together. Thus, the poly(siloxane-imide) copolymer can be a block, random, or graft copolymer. In an embodiment the copolymer is a block copolymer.

Examples of specific poly(siloxane-etherimide)s are described in U.S. Pat. Nos. 4,404,350, 4,808,686 and 4,690,997. In an embodiment, the poly(siloxane-etherimide) has units of formula (13)

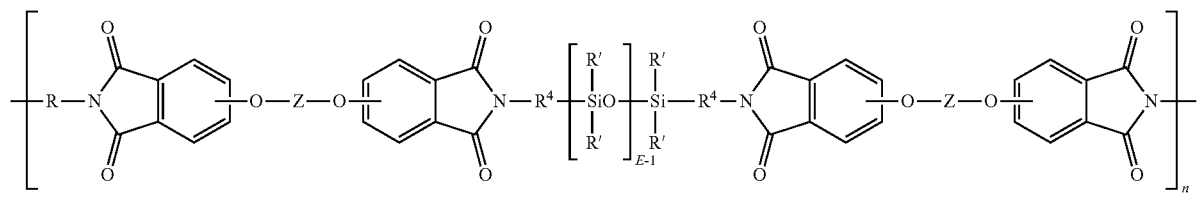
(13)

wherein R' and E of the siloxane are as in formula (11), R and Z of the imide are as in formula (5), $R^4$ is as in formula (12), and n is an integer from 5 to 100. In a specific embodiment of the poly(siloxane-etherimide), R of the etherimide is a phenylene, Z is a residue of bisphenol A, $R^4$ is n-propylene, E is 2 to 50, 5, to 30, or 10 to 40, n is 5 to 100, and each R' of the siloxane is methyl.

The relative amount of poly(siloxane) units and etherimide units in the poly(siloxane-etherimide) depends on the desired properties, and are selected using the guidelines provided herein. In particular, as mentioned above, the block or graft poly(siloxane-etherimide) copolymer is selected to have a certain average value of E, and is selected and used in amount effective to provide the desired wt % of poly (siloxane) units in the composition. In an embodiment the poly(siloxane-etherimide) comprises 10 to 50 wt %, 10 to 40 wt %, or 20 to 35 wt % poly(siloxane) units, based on the total weight of the poly(siloxane-etherimide).

The poly(etherimide)s can have a melt index of 0.1 to 10 grams per minute (g/min), as measured by American Society for Testing Materials (ASTM) D1238 at 340 to 370° C., using a 6.7 kilogram (kg) weight. In some embodiments, the poly(etherimide) has a weight average molecular weight (Mw) of 1,000 to 150,000 grams/mole (Dalton), as measured by gel permeation chromatography, using polystyrene standards. In some embodiments the poly(etherimide) has an Mw of 10,000 to 80,000 Daltons. Such poly(etherimide)s typically have an intrinsic viscosity greater than 0.2 deciliters per gram (dl/g), or, more specifically, 0.35 to 0.7 dl/g as measured in m-cresol at 25° C.

The thermoplastic composition includes the poly(etherimide) in an amount of 0.1 to 50 weight percent. Within this range, the poly(etherimide) can be present in an amount of at least 5 weight percent, or at least 10 weight percent, or at least 15 weight percent. Also within this range, the poly (etherimide) can be present in an amount of up to 40 weight percent, or up to 30 weight percent, or up to 25 weight percent.

In addition to the aromatic poly(ketone) and the poly (etherimide), the thermoplastic composition further comprises a reactive additive. The reactive additive comprises one or more reactive moieties including, but not limited to, a carboxyl group, a hydroxyl group, an amine group, an anhydride group, a mercapto group, a phenolic group, an ester group, an isocyanate group, an epoxy group, a (meth) acrylic group, or a combination thereof. In an aspect, the reactive additive can be a polymeric additive comprising at least one reactive end group. Preferably, the reactive end group on the polymeric additive comprises a carboxyl group, a hydroxyl group, an amine group, an anhydride group, a mercapto group, a phenolic group, an ester group, an isocyanate group, an epoxy group, a (meth)acrylic group, or a combination thereof, more preferably a phenolic group, an epoxy group, or a (meth)acrylic group.

In a specific embodiment, the reactive additive can be a functionalized phenylene ether oligomer, an epoxy resin, a novolac phenolic resin, or a combination thereof. The phenylene ether oligomer comprises phenylene ether repeating units of formula (14)

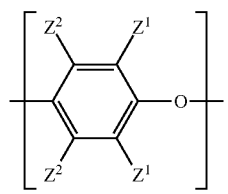

(14)

wherein for each repeating unit, each $Z^1$ is independently halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atoms; and each $Z^2$ is independently hydrogen, halogen, unsubstituted or substituted $C_{1-12}$ hydrocarbyl provided that the hydrocarbyl group is not tertiary hydrocarbyl, $C_{1-12}$ hydrocarbylthio, $C_{1-12}$ hydrocarbyloxy, or $C_{2-12}$ halohydrocarbyloxy wherein at least two carbon atoms separate the halogen and oxygen atom. In some embodiments, the poly(phenylene ether) oligomer comprises 2,6-dimethyl-1,4-phenylene ether repeating units.

The phenylene ether oligomer can be monofunctional or bifunctional. For example, it can have at least a functional group at one terminus of the polymer chain. The functional group can be as described above, and preferably is a hydroxyl group or a (meth)acrylate group. In some embodiments, the phenylene ether oligomer comprises poly(2,6-dimethyl-1,4-phenylene ether). An example of a monofunctional poly(2,6-dimethyl-1,4-phenylene ether) oligomer is NORYL™ Resin SA120, available from SABIC.

In some embodiments, the phenylene ether oligomer can be bifunctional. For example, it can have functional groups at both termini of the oligomer chain. The functional groups can be, for example, hydroxyl groups or (meth)acrylate groups. Bifunctional polymers with functional groups at both termini of the polymer chains are also referred to as "telechelic" polymers. In some embodiments, the phenylene ether oligomer comprises a bifunctional phenylene ether oligomer of formula (15)

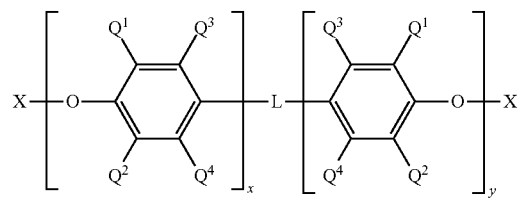

(15)

wherein $Q^1$ and $Q^2$ are each independently halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; each occurrence of $Q^3$ and $Q^4$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; x and y are independently 0 to 30, specifically 0 to 20, more specifically 0 to 15, still more specifically 0 to 10, even more specifically 0 to 8, provided that the sum of x and y is at least 2, specifically at least 3, more specifically at least 4; L has the structure according to formula (16)

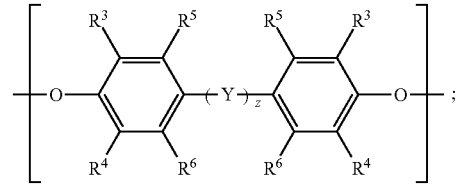

(16)

wherein each occurrence of $R^3$ and $R^4$ and $R^5$ and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms; z is 0 or 1; Y has a structure of

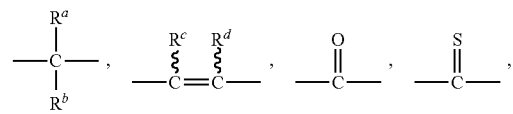

-continued

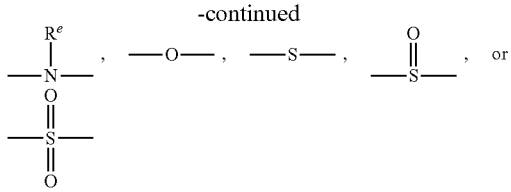

wherein each occurrence of $R^a$, $R^b$, $R^c$, $R^d$, and $R^e$ is independently hydrogen, $C_1$-$C_{12}$ hydrocarbyl, or $C_1$-$C_6$ hydrocarbylene, optionally wherein $R^a$ and $R^b$ or $R^c$ and $R^d$ together are a $C_4$-$C_8$ cycloalkylene group. Further in formula (15), X is independently at each occurrence a hydrogen or a (meth)acrylate group).

In some embodiments the phenylene ether oligomer comprises a bifunctional phenylene ether oligomer of formula (17)

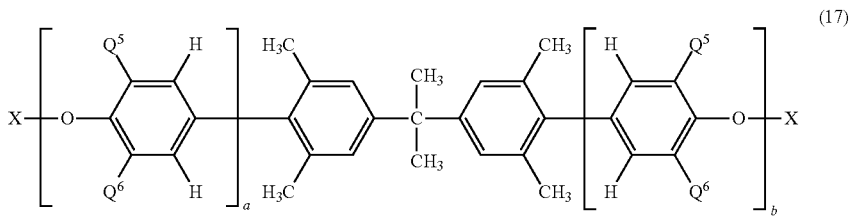

wherein each occurrence of $Q^5$ and $Q^6$ is independently methyl, di-n-butylaminomethyl, or morpholinomethyl; and each occurrence of a and b is independently 0 to 20, with the proviso that the sum of a and b is at least 2, and X is independently at each occurrence a hydrogen or a (meth) acrylate group). An exemplary bifunctional phenylene ether oligomer includes NORYL™ Resin SA90 and NORYL™ Resin SA9000, each available from SABIC.

The phenylene ether oligomer can have a number average molecular weight of 500 to 7,000 grams per mole, and a weight average molecular weight of 500 to 15,000 grams per mole, as determined by gel permeation chromatography using polystyrene standards. In some embodiments, the number average molecular weight can be 750 to 4,000 grams per mole, and the weight average molecular weight can be 1,500 to 9,000 grams per mole, as determined by gel permeation chromatography using polystyrene standards.

The reactive additive can comprise an epoxy resin. Epoxy resins useful as reactive additives can be produced by reaction of phenols or polyphenols with epichlorohydrin to form polyglycidyl ethers. Examples of useful phenols for production of epoxy resins include substituted or unsubstituted bisphenol A, bisphenol F, hydroquinone, resorcinol, tris-(4-hydroxyphenyl)methane, and novolac resins derived from phenol or o-cresol. Epoxy resins can also be produced by reaction of aromatic amines, such as p-aminophenol or methylenedianiline, with epichlorohydrin to form polyglycidyl amines. In a specific aspect, the reactive additive comprises an epoxy resin formed from reaction of bisphenol A with epichlorohydrin.

The reaction additive can also comprise a novolac phenolic resin. The novolac phenolic resin can be made by reacting a phenol with formaldehyde. The term "phenol" as used herein includes substituted and unsubstituted phenyl, aryl, and fused aromatic rings having a hydroxyl group. The molar ratio of formaldehyde to phenol is less than 1. In a specific embodiment, the phenol is bisphenol A, and the resulting bisphenol A novolac resin can be a hydroxyl group equivalence of 100 to 150 g/eq, or 110 to 130 g/eq.

The thermoplastic composition includes the reactive additive in an amount of 0.1 to 20 weight percent. Within this range, the reactive additive can be present in an amount of at least 0.5 weight percent, or at least 1 weight percent, or at least 2 weight percent. Also within this range, the reactive additive can be present in an amount of up to 10 weight percent, or up to 7 weight percent or up to 6 weight percent.

In addition to the aromatic poly(ketone), the poly(etherimide), and the reactive additive, the thermoplastic composition can optionally further include an additive composition. The additive composition comprises one or more additives selected to achieve a desired property, with the proviso that the additive(s) are also selected so as to not significantly adversely affect a desired property of the thermoplastic composition. The additive composition or individual additives can be mixed at a suitable time during the mixing of the components for forming the composition. The additive composition can include an impact modifier, flow modifier, filler (e.g., a particulate polytetrafluoroethylene (PTFE), glass, carbon, mineral, or metal), reinforcing agent (e.g., glass fibers), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination thereof. For example, a combination of an antioxidant, a thermal stabilizer, a hydrostabilizer, an ultraviolet absorber, a processing aid, and a colorant can be used. The additives are used in the amounts generally known to be effective. For example, the total amount of the additive composition (other than any impact modifier, filler, or reinforcing agent) can be up to 5 weight percent, or 0.001 to 5 weight percent, or 0.01 to 5 weight percent, each based on the total weight of the thermoplastic composition.

The thermoplastic composition can be prepared by melt mixing or a combination of dry blending and melt mixing. Melt mixing can be performed in single or twin screw type extruders or similar mixing devices which can apply a shear and heat to the components. Melt mixing can be performed at a temperatures greater than or equal to the melting temperatures of the copolymers and less than the degradation temperatures of either of the copolymers.

All of the ingredients can be added initially to the processing system. In some embodiments, the ingredients can be added sequentially and/or through the use of one or more master batches. It can be advantageous to apply a vacuum to the melt through one or more vent ports in the extruder to remove volatile impurities in the composition. In some embodiments melt-mixing is performed using an extruder and the composition exits the extruder in a strand or multiple strands. The shape of the strand is dependent upon the shape of the die used and has no particular limitation. In some embodiments the composition is the product of melt-mixing the polymers and, when present, any additives. An exemplary preparation of the thermoplastic composition is further described in the working examples below.

The thermoplastic composition can exhibit one or more advantageous properties. For example, the thermoplastic composition can have a crystallization temperature greater than or equal to 250° C., as measured from a molten polymer mixture cooled at a rate of 20° C./min. The thermoplastic composition can have a melt temperature of 250 to 450° C., more preferably 300 to 400° C. The thermoplastic composition can have a flexural modulus of greater than 2500 MPa, preferably greater than 3000 MPa determined according to ASTM D 790. The thermoplastic composition can have a flexural stress of greater than 100 MPa, preferably greater than 125 MPa, determined according to ASTM D 790. The thermoplastic composition can have a tensile stress of greater than 50 MPa, preferably greater than 75 MPa determined according to ASTM D 638. The thermoplastic composition can have a heat deflection temperature of greater than 100° C., preferably greater than 150° C. determined according to ASTM D 648 at 1.82 MPa.

The thermoplastic composition described herein can be particularly useful in electrical wire applications. Accordingly, an electrical wire comprising the thermoplastic composition is another aspect of the present disclosure. The electrical wire comprises a conductor wire and an insulating layer disposed over the conductor wire, wherein the insulating layer comprises an extrusion layer formed from the thermoplastic composition.

The composition is applied to the conductor wire by a suitable method such as extrusion coating to form a coated wire. For example, a coating extruder equipped with a screw, crosshead, breaker plate, distributor, nipple, and die can be used. The melted thermoplastic composition forms a covering disposed over a circumference of the conductor wire. Extrusion coating can employ a single taper die, a double taper die, other appropriate die or combination of dies to position the conductor centrally and avoid die lip build-up.

In some embodiments it can be useful to dry the thermoplastic composition before extrusion coating. Exemplary drying conditions are 60 to 150° C. for 2 to 20 hours.

In some embodiments, during extrusion coating, the thermoplastic composition is melt filtered, prior to formation of the coating, through one or more filters. In some embodiments the thermoplastic composition will have substantially no particles greater than 80 micrometers in size. In some embodiments any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a solvent, such as chloroform, and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a coated wire that will not have electrically conductive defects as well as providing coatings with improved mechanical properties.

The extruder temperature during extrusion coating is generally less than the degradation temperature of the aromatic poly(ketone) and poly(etherimide). Additionally the processing temperature is adjusted to provide a sufficiently fluid molten composition to afford a covering for the conductor, for example, higher than the softening point of the thermoplastic composition, or more specifically at least 20° C. higher than the melting point of the thermoplastic composition.

After extrusion coating, the conductive wire is usually cooled using a water bath, water spray, air jets or a combination comprising one or more of the foregoing cooling methods. Exemplary water bath temperatures are 20 to 90° C., or 80 to 90° C.

In some embodiments, the composition is applied to the conductor wire to form a covering disposed over and in physical contact with the conductor wire. In some embodiments, the insulating layer can comprise one or more intervening layers positioned between the conductor wire and the extrusion layer.

Any methods of coating a conductor wire that are generally known can be used. In some embodiments, the composition is applied to a conductor wire having one or more intervening layers between the conductor wire and the covering to form the insulating layer disposed over the conductor wire. For instance, an optional adhesion promoting layer can be disposed between the conductor wire and extrusion layer. In another example the conductor wire can be coated with a metal deactivator prior to applying the extrusion layer. Alternatively, a metal deactivator can be mixed with the thermoplastic composition. In another example an intervening layer comprises a thermoplastic or thermoset composition that, in some cases, is foamed.

The conductor can comprise a single strand or a plurality of strands. In some cases, a plurality of strands can be bundled, twisted, braided, or a combination of the foregoing to form a conductor. Additionally, the conductor can have various shapes such as round or oblong. Suitable materials for the conductor wires include, but are not limited to, copper, aluminum, lead, gold, silver, iron, nickel, chromium, and alloys comprising at least one of the foregoing metals. In an exemplary embodiment, the conductor wire is copper. The conductor wire can also be coated with, e.g., tin, gold or silver. In some embodiments the conductor wire comprises optical fibers.

The cross-sectional area of the conductor and thickness of the covering can vary and is typically determined by the desired application for the coated wire. The coated wire can be used as coated wire without limitation, including, for example, for harness wire for automobiles, wire for household electrical appliances, wire for electric power, wire for instruments, wire for information communication, wire for electric cars, as well as ships, airplanes, and the like. Specific applications that can benefit from coated electrical wires comprising the thermoplastic composition are those requiring high-heat, thin-walled wire coatings, for example for high-heat train, automobile, aircraft, and data transmission applications. In some specific embodiments, an article can comprise the electrical wire having a covering comprising the thermoplastic composition, wherein the article is a railway vehicle component, an automobile component, or an aircraft component.

In some embodiments the extrusion layer can have a thickness of less than 250 micrometers, preferably less than 160 micrometers. The longest dimension of a cross-sectional area of the conductor wire can be, for example, 0.1 to 5 millimeters. For example, when the conductor wire has a circular cross-sectional area, the conductor wire can have a diameter of 0.1 to 1 millimeters. For example, when the conductor wire has a rectangular cross-sectional area, the longest dimension of the rectangular cross-section can be 1 to 5 millimeters.

Multiple coated wires can be combined to form a cable. The cable can comprise additional protective elements, structural elements, or a combination thereof. An exemplary protective element is a jacket which surrounds the group of coated wires. The jacket and the covering on the coated wires, singly or in combination, can comprise the thermoplastic composition described herein. A structural element is a typically non-conductive portion which provides additional stiffness, strength, shape retention capability or the like.

The extrusion layer coating the conductor wire can exhibit one or more desirable properties. For example, the extrusion layer coating the conductor wire can have a tensile elongation of greater than 5%, preferably greater than or equal to 50%. The extrusion layer coating the conductor wire can have a breakdown voltage of greater than 10 kV, preferably greater than 13 kV, more preferably greater than 15 kV. The extrusion layer coating the conductor wire can have a adhesion strength of greater than 2.5 MPa, preferably greater than or equal to 2.7 MPa, more preferably greater than or equal to 3 MPa, even more preferably greater than 8 MPa.

Articles comprising the electrical wire represent another aspect of the present disclosure. For example, the electrical wires including the thermoplastic composition can be particularly useful for an electrical device component, a railway vehicle component, an auto-mobile component, a marine vehicle component, a construction component, construction component, a building component, or an aircraft component.

Shaped, formed, or molded articles comprising the thermoplastic compositions are also provided, according to embodiments. A method of making an article comprises blending the components of the thermoplastic composition described herein to provide a thermoplastic composition, and forming an article from the thermoplastic composition. The thermoplastic compositions can be molded into useful shaped articles by a variety of means such as injection molding, extrusion, compression molding, rotational molding, blow molding, or thermoforming. Other articles including the thermoplastic composition can include, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, thin walled articles such as housing for electronic devices and the like. Additional examples of articles that can be formed from the compositions include electrical parts, such as relays, and enclosures, consumer electronics such as enclosures and parts for laptops, desktops, docking stations, personal digital assistants (PDAs), digital cameras, desktops, and telecommunications parts such as parts for base station terminals. Further examples of articles that can be formed from compositions include light guides, light guide panels, lenses, covers, sheets, films, and the like, e.g., LED lenses, LED covers, and so forth.

This disclosure is further illustrated by the following examples, which are non-limiting.

EXAMPLES

Materials used for the following examples are described in Table 1.

TABLE 1

| Component | Description | Supplier |
| --- | --- | --- |
| PEEK | Poly(etheretherketone) commercially available as PEEK 150G | Victrex |
| PEI-1 | Poly(etherimide) having repeating units derived from bisphenol A dianhydride and para-phenylene diamine, obtained as ULTEM CRS5001 | SABIC |
| PEI-2 | Poly(etherimide) having repeating units derived from bisphenol A dianhydride and 4,4'-diaminodiphenylsulfone, having a glass transition temperature of 247° C., obtained as EXTEM VH1003 | SABIC |
| PEI-Si | A poly(etherimide-siloxane) block copolymer having a siloxane content of 20 weight percent, based on the total weight of the block copolymer, available as SILTEM 1700 | SABIC |
| PPE-OH | Copolymer of 2,6-dimethylphenol and 2,2-bis(3,5-dimethyl-4-hydroxyphenol)propane comprising a phenolic end group ortho-substituted with a di-n-butylaminomethylene group; obtained as NORYL SA90 | SABIC |
| PPE-MA | Copolymer of 2,6-dimethylphenol and 2,2-bis(3,5-dimethyl-4-hydroxyphenol)propane comprising a methacrylic end group; obtained as NORYL SA9000 | SABIC |
| BPADGE | Bisphenol A type epoxy resin, formed from reaction of epichlorohydrin with bisphenol A, obtained as EPICLON AM-040-P | DIC Corp. |
| BPANR | Bisphenol A novolac resin having a hydroxyl group equivalence of 118 g/eq, a resin softening point of 130° C., and a bifunctional bisphenol A content of 25 wt. %, obtained Phenolite KH-6021 | DIC Corp. |

The compositions of the following examples were prepared by compounding on a twin screw extruded. Each component was blended together and fed into the main feeder. Strands of the compositions were cut into pellets and then dried prior to molding and testing. Compounding conditions are summarized in Table 2.

TABLE 2

| Parameters | Unit | Set Values |
| --- | --- | --- |
| Zone 1 Temp | ° C. | 50 |
| Zone 2 Temp | ° C. | 150 |
| Zone 3 Temp | ° C. | 350 |
| Zone 4 Temp | ° C. | 370 |
| Zone 5 Temp | ° C. | 370 |
| Zone 6 Temp | ° C. | 370 |
| Zone 7 Temp | ° C. | 370 |
| Zone 8 Temp | ° C. | 370 |
| Zone 9 Temp | ° C. | 370 |
| Zone 10 Temp | ° C. | 370 |
| Zone 11 Temp | ° C. | 370 |
| Die Temp | ° C. | 370 |
| Screw speed | rpm | 400 |
| Throughput | kg/hr | 15-30 |

Samples were injection molded using a FANUC injection molding machine and according to the injection molding profiled summarized in Table 3.

TABLE 3

| Parameters | Unit | Set Values |
| --- | --- | --- |
| Cnd: Pre-drying time | Hour | 4 |
| Cnd: Pre-drying temp | ° C. | 150 |
| Hopper temp | ° C. | 70 |
| Zone 1 temp | ° C. | 350-360 |
| Zone 2 temp | ° C. | 360-370 |
| Zone 3 temp | ° C. | 370-380 |
| Nozzle temp | ° C. | 375-385 |
| Mold temp | ° C. | 140-180 |

Molded samples were tested according to the following test methods.

Heat deflection temperature (HDT) was measured according to ASTM D648 and using a testing stress of 1.82 MPa and a sample thickness of 6.4 millimeters.

Notched IZOD impact strength (NII) was measured according to ASTM D256 and using a pendulum energy of 5 lbf/ft.

Tensile properties were measured according to ASTM D638 and using a test speed of 5 millimeters per minute.

Flexural properties were measured according to ASTM D790 using a test speed on 1.27 millimeters per minute and a sample thickness of 6.4 millimeters.

Thermal properties, including Tg, Tm, and Tc, were measured by differential scanning calorimetry (DSC) according to ISO11357 using a heating/cooling rate of 20° C./min.

Specific gravity ("Sg") was measured according to ASTM D792.

Test wire samples were made by extruding the specified composition on a conductor wire with an enamel layer and an adhesive layer using an extrusion die similar to the shape of the conductor wire. In the present examples, a copper conductor wire having a rectangular cross section with chamfered edges at four corners was used. The conductor wire was coated with three layers: an enamel layer, an adhesive layer, and an extruded layer comprising the coating composition. The thickness of the coating comprising the composition was 150±10 micrometers. The breakdown voltage (BDV) of the coating layer was tested according to JIS C3216-5. Additionally, two pieces of each of the test wire samples were brought into close contact with each other with plane contact at the flat planes by using an impregnation varnish, such as epoxy resin or epoxy ester resin followed by curing. The adhesion strength with the varnish was tested according to a modified version of JIS K6850 using the above sample in place of the standard lap shear design.

Table 4 shows the compositions and the measured properties. Component amounts are given in weight percent, based on the total weight of the composition.

TABLE 4

| | Unit | CE1 | CE2 | E1 | E2 | E3 | E4 | E5 | E6 |
| --- | --- | --- | --- | --- | --- | --- | --- | --- | --- |
| PEEK | % | 80 | 80 | 76.2 | 76.2 | 78.1 | 76.2 | 76.2 | 76.2 |
| PEI-1 | % | 20 | | 19.0 | 19.0 | 19.5 | | 19.0 | 19.0 |
| PEI-2 | % | | 20 | | | | | | |
| PEI-Si | % | | | | | | 19.0 | | |
| PPE-OH | % | | | | 4.8 | 2.4 | 4.8 | | |
| PPE-MA | % | | | | | | | | 4.8 |
| BPADGE | % | | | 4.8 | | | | | |
| BPANR | % | | | | | | | 4.8 | |
| Tg | ° C. | 158 | 156 | | 153 | 153 | 156 | 148 | 155 |
| Tc | ° C. | 298 | 301 | 292 | 299 | 300 | 300 | 298 | 299 |
| Tm | ° C. | 341.6 | 343.2 | 340.4 | 343.8 | 343.8 | 344.1 | 340.6 | 343.9 |
| Tensile Stress | MPa | 90 | 93 | 92 | 88.7 | 82.3 | 86.6 | 83.4 | 90.1 |
| Flexural Stress | MPa | 143 | 147 | 151 | 146.4 | 140.7 | 133.3 | 151.2 | 138.7 |
| Flexural Modulus | MPa | 3251 | 3358 | 3326 | 3343 | 3344 | 3202 | 3726 | 3303 |
| NII | J/m | 20 | 23 | 23 | 16.7 | 19.0 | 20.4 | 16.7 | 20.8 |
| HDT, 1.82 MPa | ° C. | 162 | 172 | 152 | 164.4 | 167.4 | 159.1 | 155.3 | 169.7 |
| Sg | g/cm3 | 1.28 | 1.29 | 1.27 | 1.27 | 1.28 | 1.26 | 1.28 | 1.27 |
| Adhesion | MPa | 1.9 | 2.3 | 3.3 | 8* | 9.5* | 2.7 | 3.7 | 2.7 |
| BDV | KV | | | 15.2 | 15.7 | 19.4 | 13.1 | 15.7 | 13.9 |
| Wire Elongation | % | | | 50 | 60 | 68 | 8 | Brittle | 5 |

*The fracture mode on adhesion surface is base material fracture, which is different from other examples.

As shown in Table 4, compositions according to the examples E1-E5 including a functional additive exhibit tensile stress of greater than 80 MPa, flexural stress of greater than 130 MPa, NII of greater than 15 J/m, and HDT of greater than 150° C. The test wire examples E2-E3 show base material fracture mode on adhesion surface. The maximum reading of adhesion strength between the varnish and the extruded composition was limited by the underlying materials.

This disclosure further encompasses the following aspects, which are non-limiting.

Aspect 1: A thermoplastic composition comprising: 50 to 99.9 weight percent, or 60 to 95 weight percent, or 70 to 90 weight percent, or 70 to 80 weight percent of an aromatic poly(ketone); 0.1 to 50 weight percent, or 5 to 40 weight percent, or 10 to 30 weight percent, or 15 to 25 weight percent of a poly(etherimide); 0.1 to 20 weight percent, or 0.5 to 10 weight percent, or 1 to 7 weight percent, or 2 to 6 weight percent of a reactive additive; wherein weight percent of each component is based on the total weight of the composition.

Aspect 2: The thermoplastic composition of aspect 1, wherein the aromatic poly(ketone) comprises a poly(ether ketone), poly(ether ether ketone), poly(ether ketone ketone), or a combination comprising at least one of the foregoing, preferably a poly(ether ether ketone).

Aspect 3: The thermoplastic composition of aspect 1 or 2, wherein the poly(etherimide) comprises units of the formula

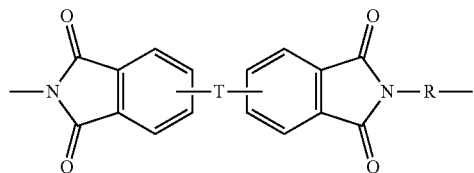

wherein R is a substituted or unsubstituted $C_{6-20}$ aromatic hydrocarbon group, a substituted or unsubstituted straight or branched chain $C_{4-20}$ alkylene group, a substituted or unsubstituted $C_{3-8}$ cycloalkylene group, T is —O— or a group of the formula —O—Z—O— wherein the divalent bonds of the —O— or the —O—Z—O— group are in the 3,3', 3,4', 4,3', or the 4,4' positions, and Z is an aromatic $C_{6-24}$ monocyclic or polycyclic group optionally substituted with 1 to 6 $C_{1-8}$ alkyl groups, 1-8 halogen atoms, or a combination comprising at least one of the foregoing; preferably, wherein R is a divalent group of the formula

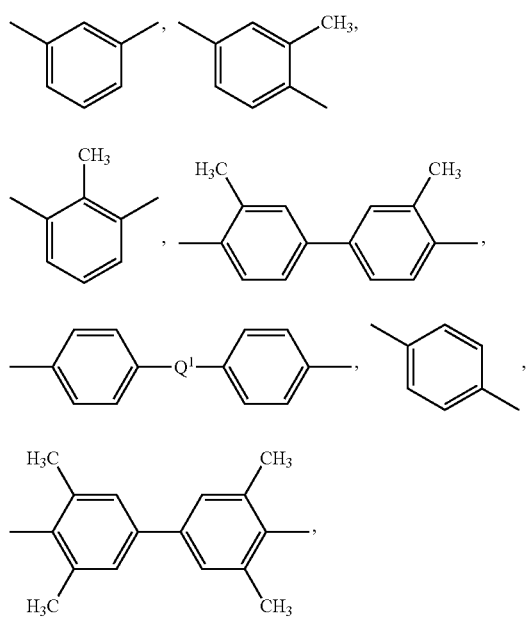

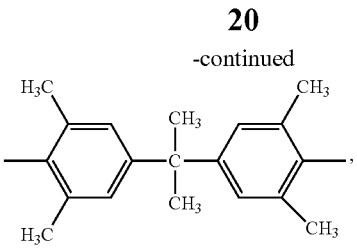

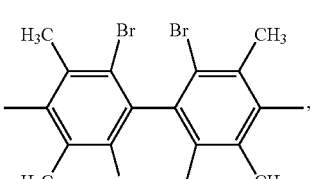

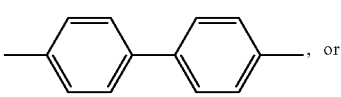, or

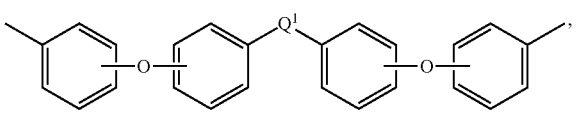

wherein $Q^1$ is —O—, —S—, —C(O)—, —SO$_2$—, —SO—, —P($R^a$)(=O)— wherein $R^a$ is a $C_{1-8}$ alkyl or $C_{6-12}$ aryl, —$C_yH_{2y}$— wherein y is an integer from 1 to 5 or a halogenated derivative thereof (which includes perfluoroalkylene groups), or —$(C_6H_{10})_z$— wherein z is an integer from 1 to 4; and Z is a group derived from a dihydroxy compound of the formula

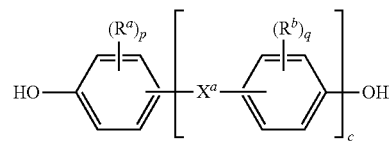

wherein $R^a$ and $R^b$ are each independently a halogen atom or a monovalent $C_{1-6}$ alkyl group; p and q are each independently integers of 0 to 4; c is 0 to 4; and $X^a$ is a single bond, —O—, —S—, —S(O)—, —SO$_2$—, —C(O)—, or a $C_{1-18}$ organic bridging group.

Aspect 4: The thermoplastic composition of any one or more of aspects 1 to 3, wherein the polyetherimide is a copolymer further comprising units of the formula

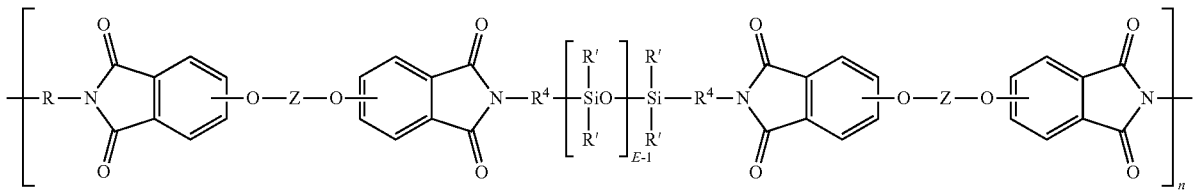

wherein each R' is independently a $C_{1-13}$ monovalent hydrocarbyl group, each $R^4$ is a $C_{2-20}$ hydrocarbyl group, E of the siloxane is 2 to 50, 5, to 30, or 10 to 40, the R and Z of the imide are as in aspect 3, and n is an integer from 5 to 100.

Aspect 5: The thermoplastic composition of any one or more of aspects 1 to 4, wherein the reactive additive is a polymeric additive comprising at least one reactive end group, preferably wherein the reactive end group comprises a carboxyl group, a hydroxyl group, an amine group, an anhydride group, a mercapto group, a phenolic group, an ester group, an isocyanate group, an epoxy group, a (meth) acrylic group, or a combination thereof, more preferably wherein the reactive end group comprises a phenolic group, an epoxy group, or a (meth)acrylic group.

Aspect 6: The thermoplastic composition of any one or more of aspects 1 to 5, wherein the reactive additive comprises a functionalized phenylene ether oligomer, an epoxy resin, a novolac phenolic resin, or a combination thereof.

Aspect 7: The thermoplastic composition of any one or more of aspects 1 to 6, wherein the composition further comprises up to 5 wt. % of an additive composition.

Aspect 8: The thermoplastic composition of aspect 7, wherein the additive composition comprises one or more of an antioxidant, a thermal stabilizer, a hydrostabilizer, an ultraviolet absorber, a processing aid, and a colorant.

Aspect 9: The thermoplastic composition of any one or more of aspects 1 to 8, wherein the composition exhibits one or more of: a crystallization temperature greater than or equal to 250° C., as measured from a molten polymer mixture cooled at a rate of 20° C./min; a melt temperature of 250 to 450° C., more preferably 300 to 400° C.; a flexural modulus of greater than 2500 MPa, preferably greater than 3000 MPa determined according to ASTM D 790; a flexural stress of greater than 100 MPa, preferably greater than 125 MPa, determined according to ASTM D 790; a tensile stress of greater than 50 MPa, preferably greater than 75 MPa determined according to ASTM D 638; a HDT of greater than 100° C., preferably greater than 150° C. determined according to ASTM D 648 at 1.82 MPa.

Aspect 10: An electrical wire comprising: a conductor wire; and an insulating layer disposed over the conductor wire, wherein the insulating layer comprises an extrusion layer formed from the thermoplastic composition of any one or more of aspects 1 to 9, optionally, wherein the insulating layers further comprises one or more intervening layers positioned between the conductor wire and the extrusion layer.

Aspect 11: The electrical wire of aspect 10, wherein the extrusion layer coating the conductor wire has one or more of the following properties: a tensile elongation of greater than 5%, preferably greater than or equal to 50%; a breakdown voltage of greater than 10 kV, preferably greater than 13 kV, more preferably greater than 15 kV; a adhesion strength of greater than 2.5 MPa, preferably greater than or equal to 2.7 MPa, more preferably greater than or equal to 3 MPa, even more preferably greater than 8 MPa.

Aspect 12: The electrical wire of aspect 10 or 11, wherein the conductor wire comprises copper, aluminum, lead, gold, silver, iron, nickel, chromium, or an alloy comprising at least one of the foregoing; and the conductor wire has a rectangular cross-section.

Aspect 13: The electrical wire of any one or more of aspects 10 to 12, wherein the extrusion layer has a thickness of less than 250 micrometers, preferably less than 160 micrometers.

Aspect 14: An article comprising the electrical wire of any one or more of aspects 10 to 13.

Aspect 15: The article of aspect 14, wherein the article is an electrical device component, a railway vehicle component, an auto-mobile component, a marine vehicle component, a construction component, construction component, a building component, or an aircraft component.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. The term "combination thereof" as used herein includes one or more of the listed elements, and is open, allowing the presence of one or more like elements not named. In addition, it is to be understood that the described elements may be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($-HC=CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($-CH_2-$) or, propylene ($-(CH_2)_3-$)). "Cycloalkylene" means a divalent cyclic alkylene group, $-C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($-NO_2$), a cyano ($-CN$), a $C_{1-6}$ alkyl sulfonyl ($-S(=O)_2$-alkyl), a $C_{6-12}$ aryl sulfonyl ($-S(=O)_2$-aryl), a thiol ($-SH$), a thiocyano ($-SCN$), a tosyl ($CH_3C_6H_4SO_2-$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $-CH_2CH_2CN$ is a $C_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:
1. A thermoplastic composition comprising:
   50 to 99.8 weight percent of an aromatic poly(ketone);
   0.1 to 49.9 weight percent of a poly(etherimide) consisting of repeating units of the formula

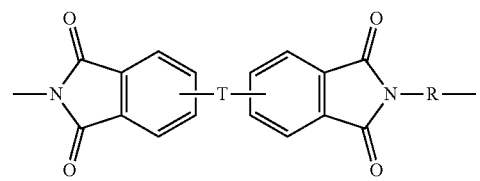

wherein
   R is p-phenylene, and
   T is a group of the formula —O—Z—O— wherein the divalent bonds of the —O— or the —O—Z—O— group are in the 3,3', 3,4', 4,3', or the 4,4' positions and Z is a divalent group of the formula

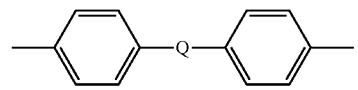

wherein Q is —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof;
   0.1 to 20 weight percent of a reactive additive, wherein the reactive additive comprises
      a functionalized phenylene ether oligomer, or
      a novolac phenolic resin;
   wherein weight percent of each component is based on the total weight of the composition.
2. The thermoplastic composition of claim 1, wherein the aromatic poly(ketone) comprises a poly(ether ketone), poly(ether ether ketone), poly(ether ketone ketone), or a combination comprising at least one of the foregoing.
3. The thermoplastic composition of claim 1, wherein Z is a divalent group of the formula

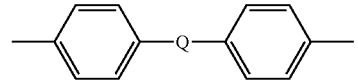

wherein Q is 2,2-isopropylidene.
4. The thermoplastic composition of claim 1, wherein the composition further comprises up to 5 wt. % of an additive composition.
5. The thermoplastic composition of claim 4, wherein the additive composition comprises an antioxidant, a thermal stabilizer, a hydrostabilizer, an ultraviolet absorber, a processing aid, a colorant, or a combination thereof.
6. The thermoplastic composition of claim 1, wherein the composition exhibits one or more of:
   a crystallization temperature greater than or equal to 250° C., as measured from a molten polymer mixture cooled at a rate of 20° C./min;
   a melt temperature of 250 to 450° C.;
   a flexural modulus of greater than 2500 MPa determined according to ASTM D 790;

a flexural stress of greater than 100 MPa, determined according to ASTM D 790;
a tensile stress of greater than 50 MPa determined according to ASTM D 638;
a HDT of greater than 100° C. determined according to ASTM D 648 at 1.82 MPa.

7. An electrical wire comprising:
a conductor wire; and
an insulating layer disposed over the conductor wire, wherein the insulating layer comprises an extrusion layer formed from the thermoplastic composition of claim 1,
optionally, wherein the insulating layers further comprises one or more intervening layers positioned between the conductor wire and the extrusion layer.

8. The electrical wire of claim 7, wherein the extrusion layer coating the conductor wire has one or more of the following properties:
a tensile elongation of greater than 5%;
a breakdown voltage of greater than 10 kV;
a adhesion strength of greater than 2.5 MPa.

9. The electrical wire of claim 7, wherein
the conductor wire comprises copper, aluminum, lead, gold, silver, iron, nickel, chromium, or an alloy comprising at least one of the foregoing; and
the conductor wire has a rectangular cross-section.

10. The electrical wire of claim 7, wherein the extrusion layer has a thickness of less than 250 micrometers.

11. An article comprising the electrical wire of claim 7.

12. The article of claim 11, wherein the article is an electrical device component, a railway vehicle component, an auto-mobile component, a marine vehicle component, a construction component, construction component, a building component, or an aircraft component.

13. The thermoplastic composition of claim 1, wherein the reactive additive is the functionalized phenylene ether oligomer.

14. The thermoplastic composition of claim 13, wherein the functionalized phenylene ether oligomer is of the formula:

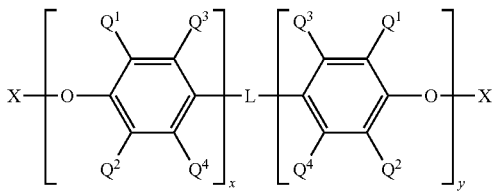

wherein
$Q^1$ and $Q^2$ are each independently halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
$Q^3$ and $Q^4$ are each independently hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_{2-12}$ halohydrocarbyloxy wherein at least two carbon atoms separate the halogen and oxygen atoms;
x and y are independently 0 to 30, provided that the sum of x and y is at least 2;
X is independently at each occurrence a hydrogen or a (meth)acrylate group; and
L has the structure

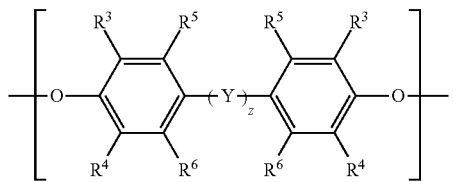

wherein
each occurrence of $R^3$ and $R^4$ and $R^5$ and $R^6$ is independently hydrogen, halogen, unsubstituted or substituted $C_{1-12}$ primary or secondary hydrocarbyl, $C_{1-12}$ hydrocarbylthio, $C_{1-12}$ hydrocarbyloxy, and $C_2$-12 halohydrocarbyloxy wherein at least two carbon atoms separate the halogen and oxygen atoms;
z is 0 or 1; and
Y has a structure of

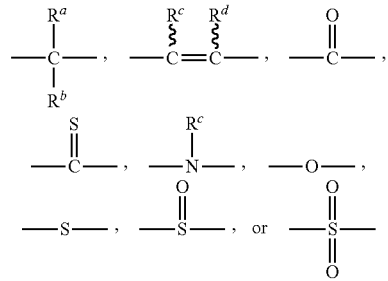

wherein each occurrence of $R^a$, $R^b$, $R^c$, $R^d$, and $R^e$ is independently hydrogen, $C_{1-12}$ hydrocarbyl, or $C_{1-6}$ hydrocarbylene, optionally wherein $R^a$ and $R^b$ or $R^c$ and $R^d$ together are a $C_4$-$C_8$ cycloalkylene group.

15. The thermoplastic composition of claim 1, wherein the functionalized phenylene ether oligomer is of the structure

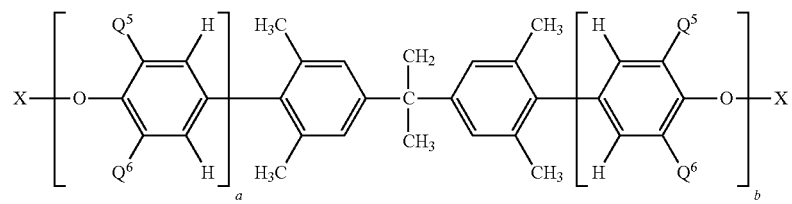

wherein
- each occurrence of $Q^5$ and $Q^6$ is independently methyl, di-n-butylaminomethyl, or morpholinomethyl;
- each occurrence of a and b is independently 0 to 20, with the proviso that the sum of a and b is at least 2; and
- X is independently at each occurrence a hydrogen or a (meth)acrylate group.

16. The thermoplastic composition of claim 1, wherein the reactive additive is the novolac phenolic resin.

17. The thermoplastic composition of claim 16, wherein the novolac phenolic resin is bisphenol A novolac resin.

* * * * *